(No Model.)

R. W. CAMPBELL.
APPARATUS FOR EXTERMINATING WEEDS.

No. 603,939. Patented May 10, 1898.

Witnesses
Harry L. Ames
L. W. Stockbridge

Inventor
Richard W. Campbell
by V. D. Stockbridge
his Attorney

UNITED STATES PATENT OFFICE.

RICHARD WARE CAMPBELL, OF WARREN, SOUTH DAKOTA.

APPARATUS FOR EXTERMINATING WEEDS.

SPECIFICATION forming part of Letters Patent No. 603,939, dated May 10, 1898.

Application filed November 16, 1897. Serial No. 658,737. (No model.)

*To all whom it may concern:*

Be it known that I, RICHARD WARE CAMPBELL, a citizen of the United States, residing in Warren, in the county of Sanborn and State of South Dakota, have invented certain new and useful Improvements in Apparatus for Exterminating Weeds, &c.; and I do hereby declare the following to be a full, clear, and exact description of the invention, such as will enable others skilled in the art to which it appertains to make and use the same.

This invention relates to apparatus for destroying weeds, insects, or eggs of insects by the use of fire on fields intended for cultivation, and is especially used for exterminating Russian thistles, together with all insects which may be on the fields treated, thereby enhancing the productiveness of the latter and preventing the destruction of crops in their early stage of growth by cut-worms and other similar pests.

The invention consists of the steps and the construction and arrangement of the several parts, which will be more fully hereinafter described and claimed.

Figure 1:
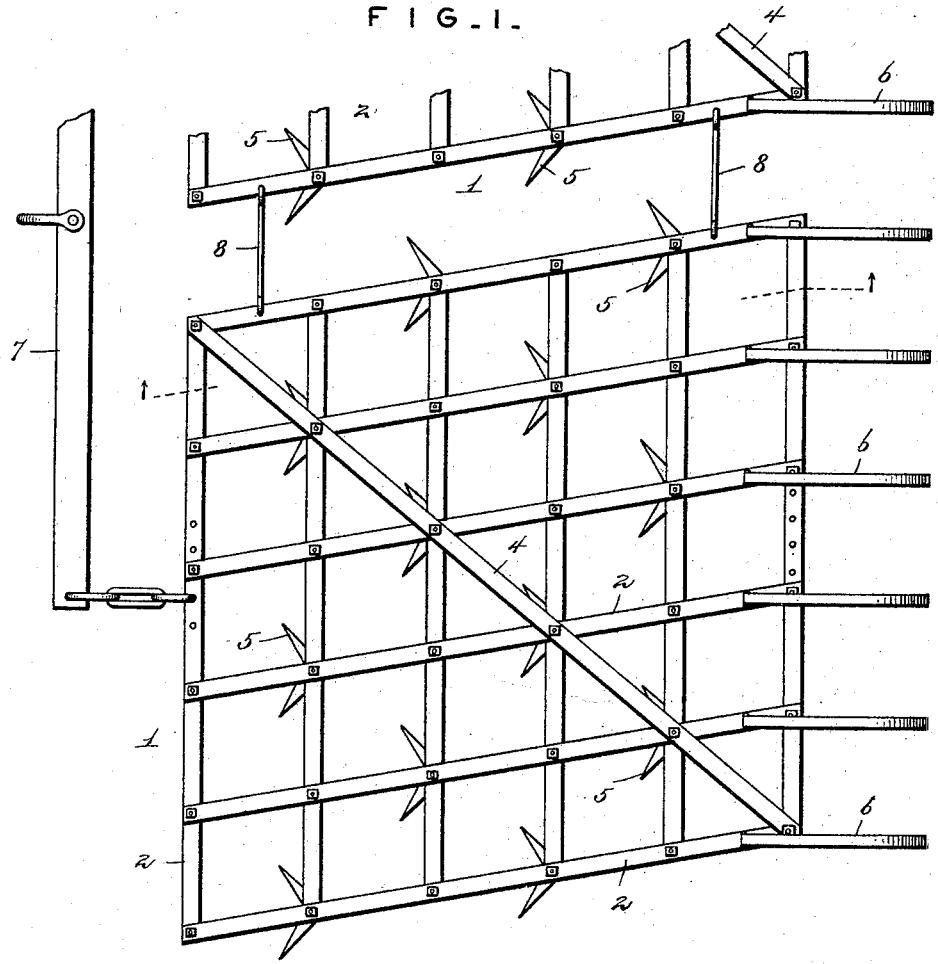
Figure 2:
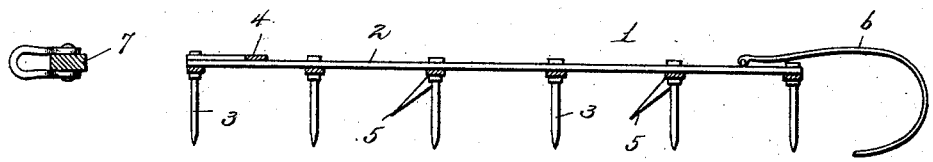
Figure 3:
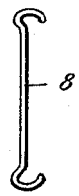

In the accompanying drawings, Figure 1 is a top plan view of a part of the device embodying the invention. Fig. 2 is a sectional view of the improved device. Fig. 3 is a detail perspective view of one of the connecting-rods.

Referring to the drawings, wherein similar numerals of reference are employed to indicate the several parts of the apparatus, the numeral 1 designates a metallic frame composed of bars 2, of steel, crossing each other and mortised at the intersections for tenons on teeth 3. A brace 4 of suitable width and length extends diagonally across the frame 1 and is provided with holes for the tenons on the teeth at the point where the said brace crosses the intersecting bars. At regular intervals pairs of obliquely-arranged forwardly-extending teeth 5 are arranged on the frame and are also formed with upper tenons to fit in portions of the frame and be secured by nuts and are adapted to loosen and throw up weeds or other deposits from the ground over which the device is moved, and at the rear a series of curved spring-teeth 6 are hinged, so that they may be thrown over the top of the frame when not in use, and when in use are adapted to gather the weeds and other deposits and drag them over the surface of the ground after the manner of a rake. The teeth 5 are attached to the frame by each alternate tooth and serve as forks, as stated, to pick up and hold the material desired to be destroyed. To the front of the frame is secured a draft-bar 7, and a series of these frames are adapted to be connected by tie-rods 8, as shown in detail in the accompanying drawings, and as many of said frames can be united as found necessary. In the latter event the draft-bar 7 is adjustably connected to the outside frame and may be changed at will. To use the device as a harrow and leveler, the spring-teeth are folded back and the team is attached to the rear bar.

The method embodied in the present invention is as follows: The team is attached to the front portion or draft-bar 7 of the device and driven at right angles to the wind on the leeward side of a field to be treated. When the teeth or forks are filled with weeds, the mass is set on fire and the implement or device as an entirety is still set in motion back and forth on the leeward side of the field and continues to gather and fire the weeds and other rubbish, continuously rolling the burning weeds close to the ground, and thereby destroying not only the weeds and rubbish which are collected, but also seeds, insects, or eggs of insects. The spring-teeth at the rear end when down will catch and prevent from escaping any weeds not consumed in the body of the implement. A further advantage in the present device is that the burned material is left upon the field and forms a valuable acquisition in the way of a fertilizer.

It is obviously apparent that many minor changes in the details of construction and arrangement of the several parts of the apparatus might be made and substituted for those shown and described without in the least departing from the nature or spirit of the invention.

Having thus described the invention, what is claimed as new is—

An apparatus for the purpose set forth, comprising a frame with a series of straight teeth, alternately arranged pairs of forwardly-extending oblique-pointed forks, and rear hinged curved spring-teeth, substantially as described.

In testimony whereof I affix my signature in presence of two witnesses.

RICHARD WARE CAMPBELL.

Witnesses:
  L. N. LOOMIS,
  D. C. WALLACE.